United States Patent
Guezelarslan et al.

(10) Patent No.: US 11,754,657 B2
(45) Date of Patent: Sep. 12, 2023

(54) UNMANNED AERIAL VEHICLE AS WELL AS DIRECTION FINDING SYSTEM

(71) Applicant: Rohde & Schwarz GmbH & Co. KG, Munich (DE)

(72) Inventors: Baris Guezelarslan, Munich (DE); Dominik Hettich, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 397 days.

(21) Appl. No.: 17/083,410

(22) Filed: Oct. 29, 2020

(65) Prior Publication Data
US 2021/0173036 A1 Jun. 10, 2021

(30) Foreign Application Priority Data
Dec. 10, 2019 (EP) ..................................... 19214989

(51) Int. Cl.
| | | |
|---|---|---|
| *G01S 3/38* | (2006.01) | |
| *G01S 3/12* | (2006.01) | |
| *B64C 39/02* | (2023.01) | |
| *H01Q 1/28* | (2006.01) | |
| *B64U 30/20* | (2023.01) | |
| *B64U 101/00* | (2023.01) | |

(52) U.S. Cl.
CPC ............. *G01S 3/38* (2013.01); *B64C 39/024* (2013.01); *G01S 3/12* (2013.01); *H01Q 1/286* (2013.01); *B64U 30/20* (2023.01); *B64U 2101/00* (2023.01)

(58) Field of Classification Search
CPC .. G01S 3/38; G01S 3/12; H01Q 1/286; B64C 39/024
USPC ........................................................ 342/443
See application file for complete search history.

(56) References Cited

U.S. PATENT DOCUMENTS

2017/0276763 A1   9/2017  Howard

FOREIGN PATENT DOCUMENTS

| CN | 105270602 A | | 1/2016 |
|---|---|---|---|
| CN | 205931231 U | * | 2/2017 |
| KR | 20170038208 A | * | 4/2017 |
| WO | 2018/040116 A1 | | 3/2018 |

* cited by examiner

*Primary Examiner* — Harry K Liu
(74) *Attorney, Agent, or Firm* — CHRISTENSEN O'CONNOR JOHNSON KINDNESS PLLC

(57) ABSTRACT

An unmanned aerial vehicle includes a main body and at least two rotor units configured to propel the unmanned aerial vehicle. The unmanned aerial vehicle includes at least two antenna units configured to receive a radio signal. The antenna units are located with respect to the main body such that the antenna units are assigned to different lateral sides of the main body. Further, a direction finding system is described.

15 Claims, 2 Drawing Sheets

UNMANNED AERIAL VEHICLE AS WELL AS DIRECTION FINDING SYSTEM

FIELD OF THE DISCLOSURE

Embodiments of the present disclosure generally relate to an unmanned aerial vehicle. Embodiments of the present disclosure further relate to a direction finding system.

BACKGROUND

In the state of the art, stationary direction finding systems are known that are used to observe a certain area. This is also known as spectrum monitoring since the electromagnetic spectrum, particularly the radio spectrum, assigned to the area to be observed is monitored in order to identify sources of radio signals, particularly interferers.

In fact, spectrum monitoring can effectively help enforcing compliance with (international) radio traffic regulations, as breaches can be recognized in time by means of radio surveillance or rather radio monitoring. Generally, radio traffic is regulated in order to ensure that when police, radio stations, air traffic control and ham radios are all on the air at the same time, they do not cause mutual interference. Compliance with the respective regulations is enforced by radio monitoring.

So far, stationary direction finding systems are used in order to locate ("direction finding") a source of a certain signal, for instance a disturbing or interfering signal. However, certain sources cannot be identified effectively, as this would require to get closer to the source, which might not be possible for several reasons.

Moreover, it can also be necessary to adapt the relative orientation with respect to the source of the certain radio signal in order to improve the receiving quality of the direction finder. This is also not always applicable since the direction finder may relate to stationary systems that cannot be moved in order to adapt the relative orientation.

Accordingly, there is a need for an improved direction finding.

SUMMARY

Embodiments of the present disclosure provide an unmanned aerial vehicle with a main body and at least two rotor units configured to propel the unmanned aerial vehicle. In an embodiment, the unmanned aerial vehicle comprises at least two antenna units configured to receive a radio signal. The antenna units are located with respect to the main body such that the antenna units are assigned to different lateral sides of the main body.

The unmanned aerial vehicle according to the present disclosure is based on the finding that the unmanned aerial vehicle (UAV), also called drone, has at least two antenna units that can be used for direction finding purposes. This can be ensured as the respective antenna units are located at different sides with respect to the main body of the unmanned aerial vehicle. Thus, the antenna units receive the incoming signals in a different manner which can be used for direction finding purposes. In some embodiments, the angle of incidence can be determined due to the fact that two antenna units are provided that are located at different sides of the main body. In some embodiments, the radio signals received by the at least two radio antennas have different radio characteristics that can be evaluated in order to locate the source of a certain radio signal. As the antenna units are assigned to different lateral sides of the main body, it is ensured that they are not situated on an upper or a lower side of the main body.

Put differently, the main body typically corresponds to a payload of the unmanned aerial vehicle, which encompasses the central control circuit, such as a control unit, as well as any sensors assigned to the unmanned aerial vehicle. In contrast to the unmanned aerial vehicles known in the state of the art, the unmanned aerial vehicle according to the present disclosure has at least two antennas that are configured to receive a radio signal. The antenna units are distanced to the main body such that the radio signals received by each of the antenna units can be analyzed, resulting in a direction finding functionality provided by the unmanned aerial vehicle. This direction finding functionality could not be provided if the respective antenna units are located close to each other, for instance on the upper side or the lower side of the main body, as the antenna units would receive radio signals with substantially the same radio characteristics.

In general, direction finding may be based on combining the direction information from two or more suitably spaced antenna units, also called receivers, wherein the source of the radio signal may be located via triangulation techniques. Thus, it is ensured that the antenna units are suitably spaced antenna units with respect to each other since they are assigned to different lateral sides of the main body of the unmanned aerial vehicle.

The unmanned aerial vehicle is generally configured to operate in areas or regions in which a stationary direction finding system cannot operate, for instance mountain side, open sea or rather border regions.

According to an aspect, the at least two antenna units are assigned to the at least two rotor units. Thus, the at least two antenna units may be directly associated with the at least two rotor units.

For instance, at least two functional pairs are provided, each pair comprising one antenna unit and one rotor unit associated thereto. Put differently, each antenna unit is assigned to a dedicated rotor unit.

According to another aspect, the antenna units are located close to the rotor units. In some embodiments, each of the antenna units may be located in direct proximity of the dedicated rotor unit. Hence, a compact unmanned aerial vehicle is provided ensuring flying functionality as well as direction finding functionality. Typically, the rotor units are assigned to the outer portions of the unmanned aerial vehicle, ensuring flight stability. As the respective antenna units are located close to the respective rotor units, the antenna units are suitably spaced with respect to each other, yielding the direction finding functionality.

For instance, each of the antenna units corresponds to a support for its assigned rotor unit. Thus, the antenna unit may support the respective rotor unit, for example a bearing for the respective rotor unit. In other words, the antenna units each may correspond to stabilizers for the dedicated rotor units.

According to another aspect, each antenna unit and its assigned rotor unit together form an integrated module or assembly. Thus, the antenna unit and its assigned rotor unit may be a separately formed module that can be connected with the main body. For instance, the main body comprises several interfaces for such integrated modules so that the main body may be expandable. In some embodiments, the number of integrated modules, namely antenna units and/or rotor units, connected with the main body may be varied due according to the respective scenario intended.

For instance, more rotor units may be required due to a higher payload. In another scenario, more antenna units may be required for improving the direction finding functionality. In general, the respective capability of the unmanned aerial vehicle ca be adapted to the respective needs.

In some embodiments, the antenna units may be located such that the distance between the antenna units is maximized. This ensures improved direction finding characteristics, as the time difference of the radio signals received by each antenna unit is maximized due to the maximized distance between the antenna units.

According to an embodiment, the unmanned aerial vehicle has at least two arms. Each arm holds one of the at least two antenna units and the dedicated rotor unit. Hence, the antenna units are spaced with respect to the main body by the corresponding arms. The respective arm may be part of the integrated module wherein the arm may provide the interface via which the integrated unit is coupled with the main body.

For instance, the unmanned aerial vehicle has more than two arms such that the respective antenna units and/or rotor units are located in a star-like manner with respect to the main body.

In some embodiments, the at least two arms extend from the main body in a radial and/or equidistant manner. This ensures that the unmanned aerial vehicle can be operated in a stable manner, as the different rotor units are spaced from each other in an equidistant manner, ensuring a homogeneous propulsion of the unmanned aerial vehicle. Accordingly, a flight stability is ensured.

The equidistant orientation of the at least two arms extending from the main body of the unmanned aerial vehicle in a radial manner results in an equidistant distance between the respective arms with respect to a circumference around the main body of the unmanned aerial vehicle.

In a first operation mode, the unmanned aerial vehicle may be configured to be operated as a flying unmanned aerial vehicle. In some embodiments, the unmanned aerial vehicle can be used to monitor areas that cannot be accessed by a stationary direction finding system, for instance open sea and/or mountain side. The rotor units are operated such that the unmanned aerial vehicle can fly. For flying operation, control signals may be received by the respective antenna units. Thus, the antenna units may be configured to receive control signals used for flying the unmanned aerial vehicle in the first operation mode.

In a second operation mode, the unmanned aerial vehicle may be configured to be operated as a direction finder, for example a stationary direction finder. In the second operation mode, which may be effective in addition to the first operation mode or (only) separate from the first operation mode, the unmanned aerial vehicle corresponds to a direction finder. Thus, the antenna units of the unmanned aerial vehicle are used to receive radio signals that are forwarded to a processing unit, such as a microprocessor, processor circuit, etc., of the unmanned aerial vehicle for being analyzed respectively.

The processing unit may be located within the main body. Hence, the main body may encompass a control unit and the processing unit. Generally, a control and/or analyzing circuit(s) or unit(s) may be located within the main body.

However, the unmanned aerial vehicle may also be operated in a stationary manner within the second operation mode. Thus, the several rotor units may not be controlled in the second operation mode.

The unmanned aerial vehicle may be configured to be operated as a mobile locator for direction finding. Thus, the unmanned aerial vehicle can also be used to get as close as possible to a certain source of a radio signal detected. This ensures that the location of the source can be identified in an improved manner. In some embodiments, the unmanned aerial vehicle, for example the processing unit connected with the antenna units in a signal transmitting manner, may determine the respective coordinates of the source of the radio signal based on the radio signals received by the at least two antenna units.

Accordingly, direction finding can be improved by the unmanned aerial vehicle being operated as a flying unmanned aerial vehicle, namely a drone, since a different line of sight can be achieved by the unmanned aerial vehicle. In some embodiments, the unmanned aerial vehicle can be flown at different heights, for example higher heights than the ones that can be achieved by a stationary direction finding system. Put differently, the relative orientation can be adapted by the unmanned aerial vehicle, as the unmanned aerial vehicle is flown to a height that enables the different line of sight with respect to the source to be identified by direction finding techniques.

For instance, the unmanned aerial vehicle comprises a base interface configured to be connected to a mast. Thus, the unmanned aerial vehicle can also be attached to the mast, for example a mast top, while the unmanned aerial vehicle is not flying.

Thus, the unmanned aerial vehicle has at least a dual functionality, as it can be operated as a mobile direction finder, namely a flying one, and a stationary direction finder that is fixedly coupled to the mast.

The mast may relate to an extractable mast. Thus, the height can be adjusted by simply extracting the mast to the desired height provided that the height can be achieved by the extractable mast.

In some embodiments, the (extractable or non-extractable) mast corresponds to a rod of a certain base station, for instance a shelter mounted on a vehicle, a standalone base station, a ship or any other system used for providing a mast used for direction finding purposes.

Another aspect provides that the unmanned aerial vehicle comprises a communications interface or module that is configured to transmit direction finding data measured. Hence, the unmanned aerial vehicle collects direction finding data when being operated as a direction finder. The respective direction finding data measured can be transmitted by the communications module, for instance to a base unit having higher computational power for analyzing the respective data collected.

The base unit used for communication purposes may be assigned to the base station.

In some embodiments, the communications module is configured to use optical communication techniques. For instance, a laser communication is established which ensures a secure communication between the unmanned aerial vehicle and the base unit. Moreover, the communication may be done by a wire or a cable provided that the unmanned aerial vehicle is connected with the mast.

Generally, the communications module corresponds to a data link circuit or module that is capable of transmitting the direction finding data measured in a way that is not interceptable by a third party not authorized.

The communication module may establish a communication link, for instance by a simple cable or rather an optical link, in order to ensure secure communication.

Embodiments of the present disclosure further provide a direction finding system that comprises a mast and an unmanned aerial vehicle as described above. The unmanned aerial vehicle is fixedly connected with the mast. Thus, the unmanned aerial vehicle may be connected by its base interface with the mast, for example a mast top.

An aspect provides that the direction finding system comprises a base unit that is configured to communicate with the unmanned aerial vehicle. The base unit may comprise a corresponding communication interface that is configured to communicate with the unmanned aerial vehicle, for example its communications module.

For instance, the base unit comprises an optical receiver that receives the laser signals transmitted by the communication module of the unmanned aerial vehicle provided that the communication module is configured to communicate by laser signals.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
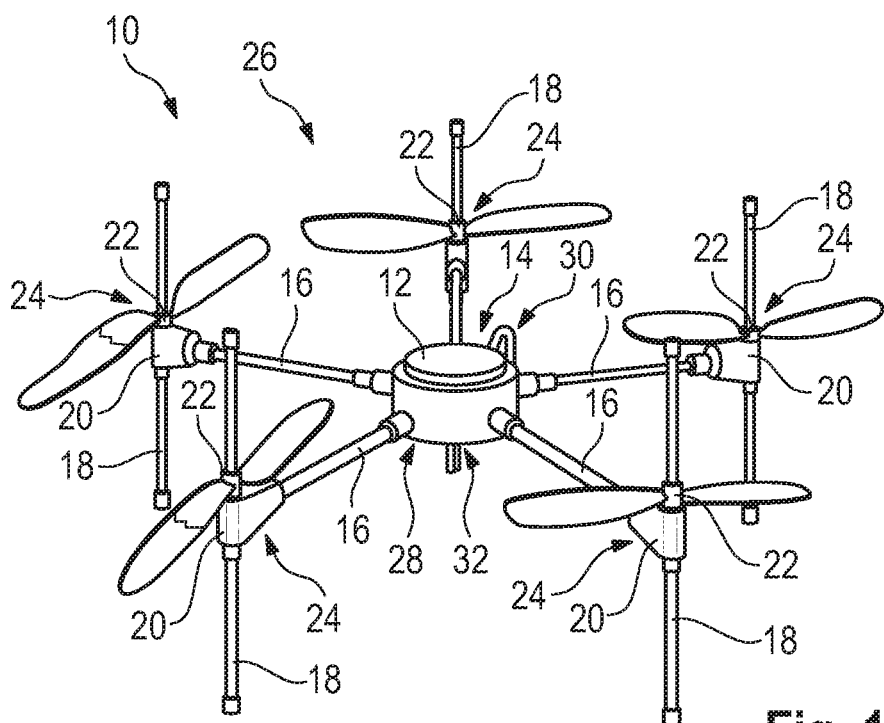
FIG. 1 schematically shows an unmanned aerial vehicle according to a first embodiment of the present disclosure.

In FIG. 1, an unmanned aerial vehicle 10 is shown that comprises a main body 12 that encompasses a control and/or analyzing circuitry, for example, a control and/or analyzing unit 14, of the unmanned aerial vehicle 10. In an embodiment, a control and/or analyzing unit 14 includes a processing circuit, such as a processing unit, and a control circuit, such as a control unit, that are separately formed with respect to each other.

In some embodiments, the term "unit" used in the preceding paragraph with regards to the unit 14 and/or its components refers to a combination of hardware (e.g. a processor such as an integrated circuit or other circuitry) and/or software (e.g. machine- or processor-executable instructions, commands, or code such as firmware, programming, or object code). Furthermore, a combination of hardware and/or software may include hardware only (i.e. a hardware element with no software elements), software hosted at hardware (e.g. software that is stored at a memory and executed or interpreted at a processor), or hardware with the software hosted thereon. In some embodiments, the hardware may, inter alia, comprise a central processing unit (CPU), a graphics processing unit (GPU), a field programmable gate array (FPGA), an application specific integrated circuit (ASIC), or other types of electronic circuitry.

The unmanned aerial vehicle 10 also includes several arms 16 that are connected with the main body 12. The arms 16 each extend from the main body 12 in a radial manner, wherein the arms 16 are distanced from each other in an equidistant manner with respect to a circumference around the main body 12.

In the shown embodiment, the unmanned aerial vehicle 10 comprises five arms 16, wherein two neighbored arms 16 define an angle α between them that corresponds to 72°. However, the unmanned aerial vehicle 10 may generally comprise more or less than the shown five arms 16.

In addition, the unmanned aerial vehicle 10 comprises several antennas, such as antenna units 18, that are located at the free ends 20 of the arms 16. The free ends 20 relate to the ends that are opposite to the main body 12 to which the arms 16 are connected. Accordingly, the antenna units 18 are distanced (spaced) from the main body 12 by a maximum distance. The maximum distance is defined by the length of the respective arm 16. Furthermore, the antenna units 18 are also distanced from each other in a maximal manner.

As shown in FIG. 1, the antenna units 18 extend in a (substantially) perpendicular direction with respect to the extension direction of the arms 16. In some embodiments, prolongations of the arms 16 intersect each other in a center point that coincidences with the center of the main body 12.

In contrast to the arms 16, the antenna units 18 each define a longitudinal axis, wherein the longitudinal axes of the antenna units 18 extend parallel with respect to each other. In some embodiments, the longitudinal axes of the antenna units 18 are normal to a surface of the main body 12.

The unmanned aerial vehicle 10 further comprises several rotors, such as rotor units 22, that are also assigned to the free ends 20 of the arms 16. The rotor units 22 are generally configured to propel the unmanned aerial vehicle 10. In some embodiments, the rotor units 22 are supported by the antenna units 18. In other words, each of the antenna units 18 corresponds to a dedicated support for its assigned rotor unit 22.

As shown in FIG. 1, the entire unmanned aerial vehicle 10 has, in a top view on the unmanned aerial vehicle 10, a star-like shape.

In some embodiments, the antenna units 18 as well as the associated rotor units 22 are assigned to lateral ends, namely the free ends 20, of the arms 16 that extend in a radial manner from the centrally arranged main body 12 of the unmanned aerial vehicle 10.

Accordingly, the antenna units 18 are located with respect to the main body 12 of the unmanned aerial vehicle 10 such that the antenna units 18 are assigned to different lateral sides of the main body 12.

In a similar manner, the rotor units 22 are also assigned to different lateral sides of the main body 12, as the rotor units 22 are directly assigned to the respective antenna units 18.

Accordingly, the antenna units 18 and the rotor units 22 are located in close proximity of each other.

The antenna unit 18 and the assigned rotor unit 22 may together form an integrated assembly or module 24 that can be connected with the main body 12 of the unmanned aerial vehicle 10.

In some embodiments, the integrated module 24 may also comprise the respective arm 16 to which the antenna unit 18 is connected. Thus, the arm 16 may provide an interface of the integrated module 24 via which the integrated module 24 can be connected with the main body 12.

The main body 12 may comprise several corresponding interfaces such that several integrated modules 24 may be connected to the main body 12.

Generally, the main body 12 may be configured in a modular manner such that the number of antenna units 18 and/or rotor units 22 can be extended if desired. In some embodiments, the number of integrated modules 24 can be adapted in a desired manner.

The unmanned aerial vehicle 10 may be operated as a flying unmanned aerial vehicle. Hence, the unmanned aerial vehicle 10 may have a first operation mode, in which the unmanned aerial vehicle 10 is controlled to fly. Thus, the unmanned aerial vehicle 10 may receive respective control signals via its antenna units 18 that are forwarded to the control and/or analyzing unit 14 of the unmanned aerial vehicle 10 for controlling the respective rotor units 22 in an appropriate manner.

In the first operation mode, namely the flying mode, the unmanned aerial vehicle 10 may also be configured to be used as a mobile locator 26 for direction finding. This means that the unmanned aerial vehicle 10 is flown to a certain area, for example an area that cannot be accessed by a stationary direction finding system.

When being operated as a mobile locator 26, the unmanned aerial vehicle 10 may receive radio signals from the respective area monitored. Then, the unmanned aerial vehicle 10 is enabled to perform direction finding in order to locate a source of a certain radio signal, for instance an interferer. The respective direction finding data measured by the unmanned aerial vehicle 10 may be (temporarily) stored in a storage 28 that may also be encompassed by the main body 12.

Further, the unmanned aerial vehicle 10 may comprise a communications interface or module 30 that can also be encompassed in the main body 12. The communications module 30 may include, for example, one or more communications circuits for implement one-way (e.g., transmit or receive) and/or bi-directional (e.g., transmit and receive) communications as further described herein.

The unmanned aerial vehicle 10 is configured to communicate via the communication module 30 with a base unit (not shown in FIG. 1) in order to forward the respective direction finding data measured for evaluating purposes as will be explained later.

The communication module 30 may use optical communication techniques in order to transmit the respective direction finding data measured. For instance, laser technologies are used to communicate the respective data. Thus, a secure communication is ensured that is not interceptable by a third party which is not authorized to intercept the respective communication.

In a second operation mode, which may be effective alternatively or additionally to the first operation mode, the unmanned aerial vehicle 10 is configured to be operated as a (stationary) direction finder. As already mentioned above, the unmanned aerial vehicle 10 may be operated as a mobile locator 26. Thus, the unmanned aerial vehicle 10 can identify and locate a certain source of a radio signal.

In some embodiments, the unmanned aerial vehicle 10 may also be operated as a stationary direction finder. In this mode, the rotor units 22 of the unmanned aerial vehicle 10 are not controlled to propel the unmanned aerial vehicle 10.

Figure 3:
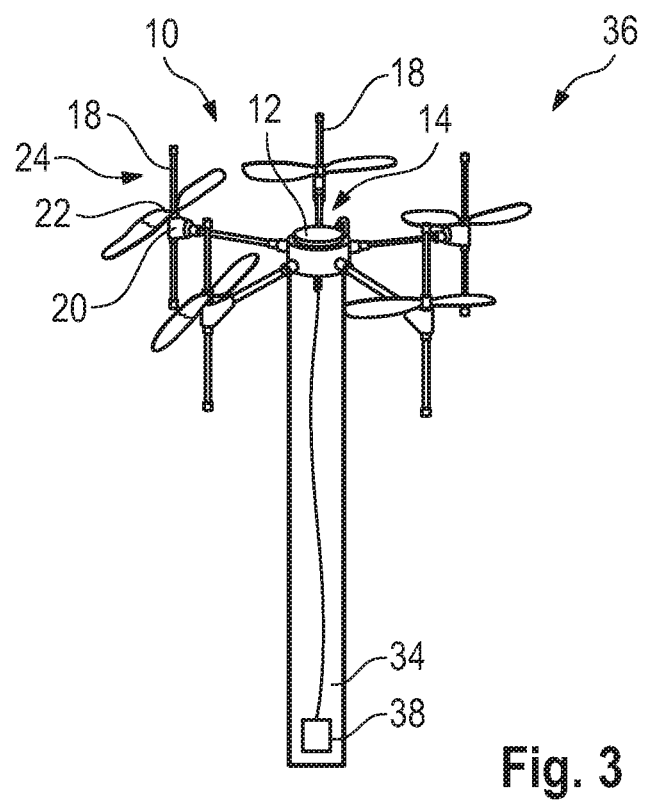
FIG. 3 schematically shows a representative embodiment of a direction finding system according to the present disclosure.

In some embodiments, the unmanned aerial vehicle 10 comprises a base interface 32 that may be assigned to the main body 12. The unmanned aerial vehicle 10 may be connected to a mast 34 via the base interface 32. The mast 34 may relate to a direction finding system 36 that comprises the unmanned aerial vehicle 10 as well as the mast 34. In FIG. 3, the direction finding system 36 is shown in which the unmanned aerial vehicle 10 of FIG. 1 is connected to the mast 34.

In other words, the unmanned aerial vehicle 10 has a constructive design such that the main body 12 or rather the antenna units 18 may serve as support stands for the unmanned aerial vehicle 10 while not flying. In this stationary operation mode, the unmanned aerial vehicle 10 is, for example, fixedly connected with the mast 34.

In some embodiments, the mast 34 may be extractable or non-extractable. Thus, the mast 34 corresponds to a rod of a certain base station, for instance a shelter mounted on a vehicle, a standalone base station, a ship or any other system used for direction finding.

Generally, the unmanned aerial vehicle 10 may be connected with a base unit 38 of the direction finding system 36 by a cable or a wire, ensuring secure communication.

Figure 2:
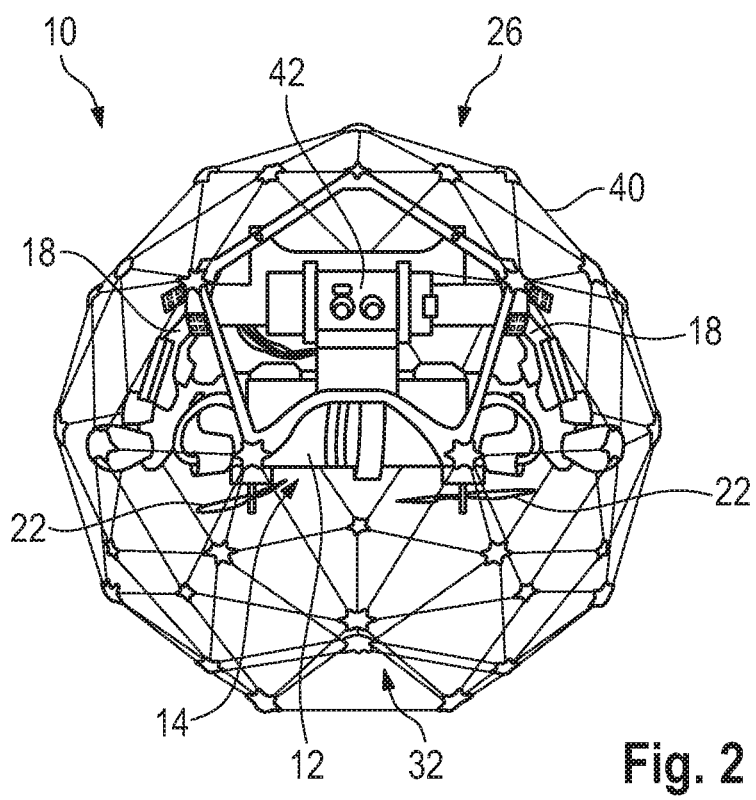
FIG. 2 schematically shows an unmanned aerial vehicle according to a second embodiment of the present disclosure.

In FIG. 2, another embodiment of the unmanned aerial vehicle 10 is shown. In the second embodiment, the antenna units 18 are also assigned to different lateral sides of the main body 12. However, the rotor units 22 are not directly assigned to the respective antenna units 18, but to a lower side of the main body 12.

Generally, the unmanned aerial vehicle 10 may have different designs with regard to the respective arrangement of the rotor units 22 and the antenna units 18. Moreover, the unmanned aerial vehicle 10 shown in FIG. 2 comprises a cage 40 for protecting the components of the unmanned aerial vehicle 10, for example the rotor units 22 and/or the antenna units 18. In addition, the unmanned aerial vehicle 10 may comprise at least one further module 42 for collecting data, such as a camera.

Figure 4:
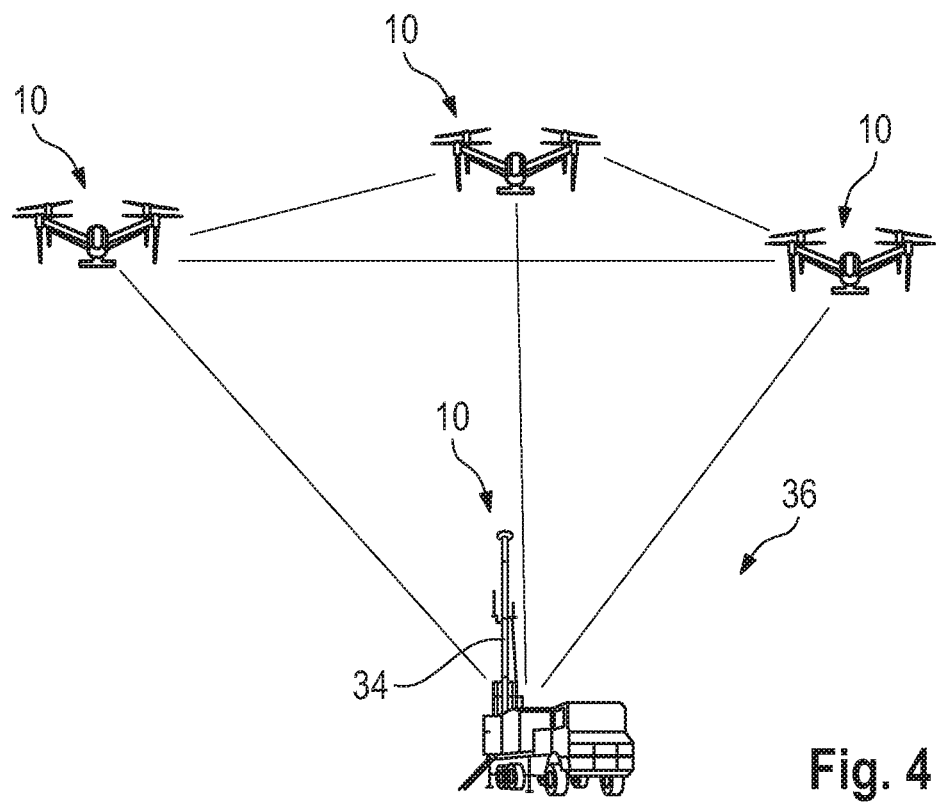
FIG. 4 schematically shows another embodiment of a direction finding system according to the present disclosure, which comprises several unmanned aerial vehicles according to the present disclosure in an operative scenario.

In FIG. 4, another embodiment of a direction finding system 36 is shown that comprises several unmanned aerial vehicles 10 operated in a flying mode as well as one unmanned aerial vehicle 10 fixedly connected to the mast 34.

As shown in FIG. 4, the mast 34 is assigned to a vehicle. The direction finding system 36 comprises the base unit 38 that is assigned to the vehicle.

The flying unmanned aerial vehicles 10 communicate with the base unit 38 by their communications modules 30 in order to forward the direction finding data measured via the antenna units 18. Accordingly, these unmanned aerial vehicles 10 may correspond to mobile locators 26. Furthermore, the flying unmanned aerial vehicles 10 may receive control signals via their antenna units 18. The stationary unmanned aerial vehicle 10, namely the one connected to the mast 34, is only operated as a direction finder, as the respective rotor units 22 are not controlled.

Generally, the base unit 38 communicating with the communication module(s) 30 of the unmanned aerial vehicle(s) 10 may comprise high computational power. This ensures that the base unit 38 may process direction finding data measured by several unmanned aerial vehicles 10.

Certain embodiments disclosed herein utilize circuitry (e.g., one or more circuits) in order to implement protocols, methodologies or technologies disclosed herein, operably couple two or more components, generate information, process information, analyze information, generate signals, encode/decode signals, convert signals, transmit and/or receive signals, control other devices, etc. Circuitry of any type can be used. It will be appreciated that the term "information" can be use synonymously with the term "signals" in this paragraph. It will be further appreciated that the terms "circuitry," "circuit," "one or more circuits," etc., can be used synonymously herein.

In an embodiment, circuitry includes, among other things, one or more computing devices such as a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof, and can include discrete digital or analog circuit elements or electronics, or combinations thereof. In an embodiment, circuitry includes hardware circuit implementations (e.g., implementations in analog circuitry, implementations in digital circuitry, and the like, and combinations thereof).

In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes one or more processors or portions thereof and accompanying software, firmware, hardware, and the like.

In some examples, the functionality described herein can be implemented by special purpose hardware-based computer systems or circuits, etc., or combinations of special purpose hardware and computer instructions.

Of course, in some embodiments, two or more of these components, or parts thereof, can be integrated or share hardware and/or software, circuitry, etc. In some embodiments, these components, or parts thereof, may be grouped in a single location or distributed over a wide area. In circumstances were the components are distributed, the components are accessible to each other via communication links.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. An unmanned aerial vehicle with a main body and at least two rotor units configured to propel the unmanned aerial vehicle, wherein the unmanned aerial vehicle comprises at least two antenna units configured to receive a radio signal, and wherein the antenna units are located with respect to the main body such that the antenna units are assigned to different lateral sides of the main body,
wherein the unmanned aerial vehicle comprises at least one of a base interface, the base interface being configured to be connected to a mast, or a communications interface configured to transmit direction finding data measured, wherein the communications interface is configured to use optical communication techniques.

2. The unmanned aerial vehicle according to claim 1, wherein the at least two antenna units are assigned to the at least two rotor units.

3. The unmanned aerial vehicle according to claim 1, wherein the antenna units are located close to the rotor units.

4. The unmanned aerial vehicle according to claim 1, wherein each of the antenna units corresponds to a support for its assigned rotor unit.

5. The unmanned aerial vehicle according to claim 1, wherein each antenna unit and its assigned rotor unit together form an integrated module.

6. The unmanned aerial vehicle according to claim 1, wherein the antenna units are located such that the distance between the antenna units is maximized.

7. The unmanned aerial vehicle according to claim 1, wherein the unmanned aerial vehicle has at least two arms, wherein each arm holds one of the at least two antenna units and the dedicated rotor unit.

8. The unmanned aerial vehicle according to claim 7, wherein the at least two arms extend from the main body in a radial and/or equidistant manner.

9. The unmanned aerial vehicle according to claim 1, wherein, in a first operation mode, the unmanned aerial vehicle is configured to be operated as a flying unmanned aerial vehicle.

10. The unmanned aerial vehicle according to claim 1, wherein, in a second operation mode, the unmanned aerial vehicle is configured to be operated as a direction finder.

11. The unmanned aerial vehicle according to claim 10, in the second operation mode, the unmanned aerial vehicle is configured to be operated as a stationary direction finder.

12. The unmanned aerial vehicle according to claim 1, wherein the unmanned aerial vehicle is configured to be operated as a mobile locator for direction finding.

13. A direction finding system comprising a mast and an unmanned aerial vehicle according to claim 1, wherein the unmanned aerial vehicle is fixedly connected with the mast.

14. The direction finding system according to claim 13, wherein the direction finding system comprises a base unit that is configured to communicate with the unmanned aerial vehicle.

15. An unmanned aerial vehicle with a main body and at least two rotor units configured to propel the unmanned aerial vehicle, wherein the unmanned aerial vehicle comprises at least two antenna units configured to receive a radio signal, and wherein the antenna units are located with respect to the main body such that the antenna units are assigned to different lateral sides of the main body, wherein each of the antenna units corresponds to a support for its assigned rotor unit, and wherein the unmanned aerial vehicle has several arms that are connected with the main body, wherein the arms extend from the main body in a radial manner, wherein the antenna units are located at free ends of the arms, and wherein the antenna units extend in perpendicular direction with respect to an extension direction of the arms.

\* \* \* \* \*